US008630004B2

(12) United States Patent
Iwamoto et al.

(10) Patent No.: US 8,630,004 B2
(45) Date of Patent: Jan. 14, 2014

(54) IMAGE FORMING APPARATUS, BILLING METHOD THEREOF AND RECORDING MEDIUM

(75) Inventors: Hiroshi Iwamoto, Toyohashi (JP); Takashi Oikawa, Toyohashi (JP); Tomokazu Kato, Toyokawa (JP); Jiro Goto, Toyokawa (JP); Yuji Kawamura, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1179 days.

(21) Appl. No.: 12/501,546

(22) Filed: Jul. 13, 2009

(65) Prior Publication Data

US 2010/0014117 A1 Jan. 21, 2010

(30) Foreign Application Priority Data

Jul. 18, 2008 (JP) ................................ 2008-187941

(51) Int. Cl.
*G06F 3/12* (2006.01)
*G06F 17/00* (2006.01)

(52) U.S. Cl.
USPC .......................................... 358/1.15; 705/400

(58) Field of Classification Search
USPC .......................................... 358/1.15; 705/400
See application file for complete search history.

(56) References Cited

U.S. PATENT DOCUMENTS

| | | | | |
|---|---|---|---|---|
| 6,705,781 | B2 | 3/2004 | Iwazaki | |
| 7,222,293 | B1 * | 5/2007 | Zapiec et al. | 715/205 |
| 2002/0054324 | A1 | 5/2002 | Okada et al. | |
| 2002/0057451 | A1 * | 5/2002 | Ishijima | 358/1.15 |
| 2002/0165833 | A1 * | 11/2002 | Minowa et al. | 705/400 |

FOREIGN PATENT DOCUMENTS

| | | | |
|---|---|---|---|
| JP | 2002-092355 | | 3/2002 |
| JP | 2002-108578 | A | 4/2002 |
| JP | 2002-366471 | A | 12/2002 |
| JP | 2003-122538 | | 4/2003 |
| JP | 2003-150848 | | 5/2003 |
| JP | 2004-237608 | | 8/2004 |
| JP | 2006-113948 | A | 4/2006 |
| JP | 2006-155352 | A | 6/2008 |

OTHER PUBLICATIONS

Notification of Reasons for Refusal issued in the corresponding Japanese Patent Application No. 2008-187941 dated Apr. 20, 2010, and an English Translation thereof.

* cited by examiner

*Primary Examiner* — Twyler Haskins
*Assistant Examiner* — Justin Katzwhite
(74) *Attorney, Agent, or Firm* — Buchanan Ingersoll & Rooney PC

(57) ABSTRACT

An image forming apparatus comprises: an image data obtainer that obtains image data by a Web browser from a Website via a network; a printer that prints out the obtained image data and other image data; and a billing portion that bills a usage fee if the Web browser is used, meanwhile discounts the usage fee to be billed if the Web browser is used and also the image data obtained by the Web browser is printed out by the printer.

20 Claims, 9 Drawing Sheets

IMAGE FORMING APPARATUS, BILLING METHOD THEREOF AND RECORDING MEDIUM

This application claims priority under 35 U.S.C. §119 to Japanese Patent Application No. 2008-187941 filed on Jul. 18, 2008, the entire disclosure of which is incorporated herein by reference in its entirety.

BACKGROUND OF THE INVENTION

1. Field of the Invention

The present invention relates to an image forming apparatus having a Web (World Wide Web) browser installed thereon, which is capable of printing out image data obtained by the Web browser from Websites via the Internet or etc. and other image data; a billing method of the image forming apparatus; and a computer readable recording medium having a billing program recorded therein to make a computer execute processing.

2. Description of the Related Art

The following description sets forth the inventor's knowledge of related art and problems therein and should not be construed as an admission of knowledge in the prior art.

Among the image forming apparatuses such as MFPs (Multi Function Peripherals) that are multifunctional digital machines collectively having a plurality of functions, for example the copy function, the print function and the facsimile function, there exist some image forming apparatuses having a Web browser installed thereon, which is software to view Web pages and obtain image data from Websites.

Such image forming apparatuses generally have a counter that counts the number of printed sheets and bills a print fee according to the counter. Installation of the Web browser as mentioned above serves to print out image data obtained from Websites via the Internet or etc. and eventually create more opportunities for printing and promote print practice, which is one of the intentions thereof.

However, such a configuration also allows using the Web browser without using print services, which hardly provides the effect of promoting print practice.

Consequently, a function is added on the image forming apparatuses to bill to users, a usage fee for using a Web browser in addition to a print fee, in order to make a return on the cost for the Web browser and prevent unlimited use of the Web browser.

As disclosed in Japanese Unexamined Laid-open Patent Publication No. 2002-366471, there exists a technology to print Internet advertisement information together with personally-identifying information owned by a portable electronic device such as a cell-phone, and printer's environmental information, onto a print result of information owned by the portable electronic device. And thereby, an amount billed is reduced if such advertisement information is printed out.

And as disclosed in Japanese Unexamined Laid-open Patent Publication No. 2002-108578, there exists a technology to print an advertisement together with print data obtained from a user's owning terminal. And thereby, the user receives print services for free.

However, such a configuration to bill a usage fee for using a Web browser in addition to a print fee, requires users who intentionally use the Web browser for print services, to pay both a usage fee for using a Web browser and a print fee without discount benefits. Thus, installation of a Web browser produces the opposite effect against promoting print practice and it does not provide benefits for users who use the Web browser to use print services.

Furthermore, the technologies disclosed in the two publications described above do not provide a complete resolution against these inconveniences.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

The preferred embodiments of the present invention have been developed in view of the above-mentioned and/or other problems in the related art. The Preferred embodiments of the present invention can significantly improve upon existing methods and/or apparatuses.

It is an object of the present invention to provide an image forming apparatus that is capable of eliminating inconveniences that users who intentionally use a Web browser for print services have to pay both a usage fee for using the Web browser and a print fee without discount benefits, and also promoting print practice by installation of the Web browser.

It is another object of the present invention to provide a billing method of the image forming apparatus that is capable of eliminating inconveniences that users who intentionally use a Web browser for print services have to pay both a usage fee for using the Web browser and a print fee without discount benefits, and also promoting print practice by installation of the Web browser.

It is yet another object of the present invention to provide a computer readable recording medium having a billing program recorded therein to make a computer of the image forming apparatus implement the billing method.

According to a first aspect of the present invention, an image forming apparatus includes:

an image data obtainer that obtains image data by a Web browser from a Website via a network;

a printer that prints out the obtained image data and other image data; and a billing portion that bills a usage fee if the Web browser is used, meanwhile discounts a usage fee to be billed if the Web browser is used and also the image data obtained by the Web browser is printed out by the printer.

According to a second aspect of the present invention, an image forming apparatus includes:

an image data obtainer that obtains image data by a Web browser from a Website via a network;

a printer that prints out the obtained image data and other image data;

a memory that records in itself, the image data obtained by the Web browser; and a billing portion that bills a print fee if image data other than the one obtained by the Web browser among the image data recorded in the memory is printed out by the printer, meanwhile discounts a print fee to be billed if the image data obtained by the Web browser then recorded in the memory is printed out by the printer.

According to a third aspect of the present invention, a billing method of an image forming apparatus includes:

obtaining image data by a Web browser from a Website via a network;

printing out the obtained image data and other image data by a printer; and billing a usage fee if the Web browser is used, meanwhile discounting a usage fee to be billed if the Web browser is used and also the image data obtained by the Web browser is printed out by the printer.

According to a fourth aspect of the present invention, a billing method of an image forming apparatus includes:

obtaining image data by a Web browser from a Website via a network;

printing out the obtained image data and other image data by a printer;

recording in a memory the image data obtained by the Web browser; and billing a print fee if image data other than the one obtained by the Web browser among the image data recorded in the memory is printed out by the printer, meanwhile discounting a print fee to be billed if the image data obtained by the Web browser then recorded in the memory is printed out by the printer.

According to a fifth aspect of the present invention, a computer readable recording medium has a billing program recorded therein to make a computer of an image forming apparatus execute:

obtaining image data by a Web browser from a Website via a network;

printing out the obtained image data and other image data by a printer; and billing a usage fee if the Web browser is used, meanwhile discounting a usage fee to be billed if the Web browser is used and also the image data obtained by the Web browser is printed out by the printer.

According to a sixth aspect of the present invention, a computer readable recording medium has a billing program recorded therein to make a computer of an image forming apparatus execute:

obtaining image data by a Web browser from a Website via a network;

printing out the obtained image data and other image data by a printer;

recording in a memory the image data obtained by the Web browser; and billing a print fee if image data other than the one obtained by the Web browser among the image data recorded in the memory is printed out by the printer, meanwhile discounting a print fee to be billed if the image data obtained by the Web browser then recorded in the memory is printed out by the printer.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
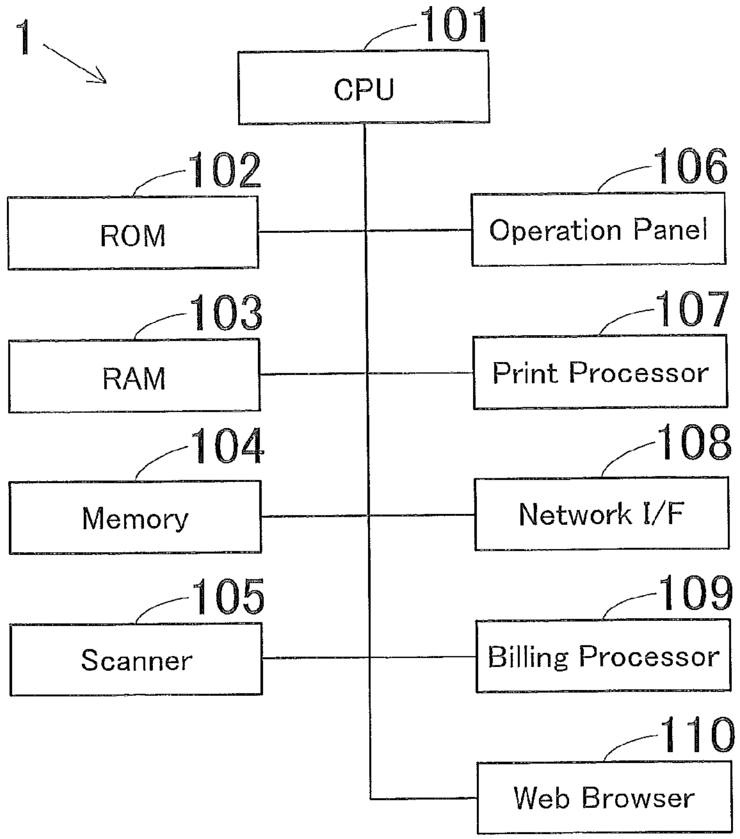
FIG. 1 is a block diagram showing a functional configuration of an image forming apparatus according to one embodiment of the present invention.

FIG. 1 is a block diagram showing a functional configuration of an image forming apparatus according to one embodiment of the present invention.

In this embodiment, the above-mentioned MFP is employed as an image forming apparatus 1. This image forming apparatus 1 includes a CPU 1, a ROM 102, a RAM 103, a memory 104, a scanner 105, an operation panel 106, a print processor 107, a network interface (I/F) 108, a billing processor 109 and a Web browser 110.

The CPU 101 centrally controls all the operations of the image forming apparatus 1. The ROM 102 is a memory that records in itself an operation program of the CPU 101. The RAM 103 is a memory that provides an operation area for the CPU 101 to execute processing according to the operation program.

In this embodiment, as well as various data, application programs and etc., the memory 104 records in itself image data and etc. obtained (downloaded) by the Web browser 110 from Websites and fee data and etc. used to bill a usage fee for using the Web browser and printing.

The scanner 105 reads images and etc. on a document, converts them into image data that is electronic data for outputting.

The operation panel 106 is used by users to enter instructions for the image forming apparatus 1 and displays operation states of the image forming apparatus 1, messages and other information for users. And it includes a key entry portion having numeric keys, a start key and other keys, and a display such as a liquid crystal display with touch-panel functionality. Contents of Websites and etc. are displayed on the display, by the Web browser 110.

The print processor 107 prints out image data read out by the scanner 105, image data recorded in the memory 104, image data displayed on the operation panel 106 by the Web browser, and other data.

Figure 2:
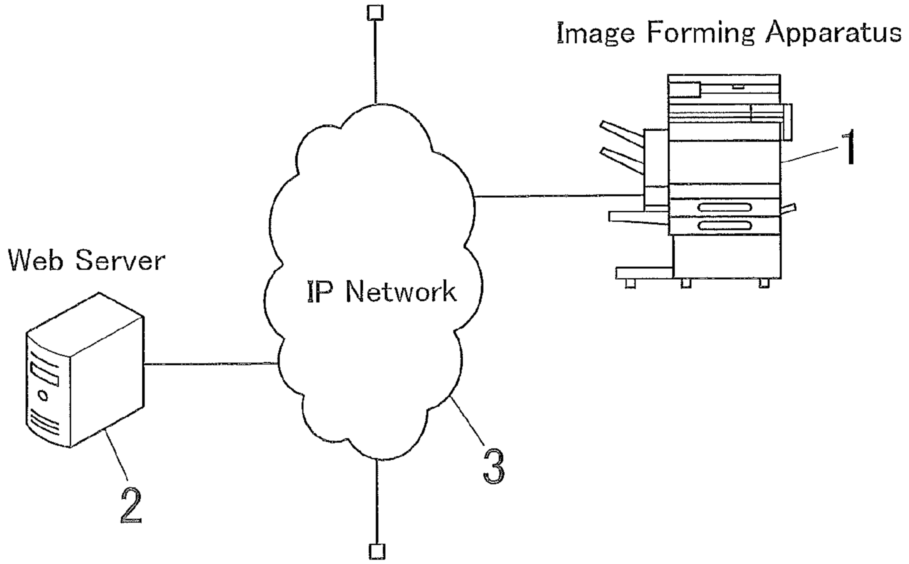
FIG. 2 is a view showing the image forming apparatus connected to a Web server via an IP network such as the Internet.

The network interface (I/F) 108 exchanges data with other image forming apparatuses and user terminals, and also allows the image forming apparatus 1 to access Websites stored on the Web server 2, via the IP network 3 such as the Internet, as shown in FIG. 2.

The billing processor 109 bills a usage fee or a print fee to users who used a Web browser or print services, and makes a discount if image data obtained by the Web browser is printed out. This billing processor 109 is configured as a part of the function of the CPU 101.

The Web browser portion 110 displays contents of Websites accessed via the IP network and other information on a display of the operation panel 106 and obtains (downloads) image data from the Web server 2 and Websites linked therefrom, according to instructions from a Web browser that is software to view Web pages.

Like the billing processor 109, this Web browser portion 110 is also configured as a part of the function of the CPU 101.

Hereinafter, a billing procedure executed in the image forming apparatus 1 of FIG. 1, will be explained with reference to a flowchart shown in FIG. 3.

This billing procedure and the other billing procedures executed in the embodiments of the present invention to be described later, are executed by the CPU 101, according to an operation program recorded in the ROM 102 or another recording medium.

A usage fee for using a Web browser per unit time should be set in advance on the image forming apparatus 1 (for example, it is set as "¥10/60" for the case of Usage Fee Per Unit Time: 10 yen for every 60 seconds).

In Step S01, the routine waits until use of the Web browser is started. If use of the Web browser is started (YES in Step S01), measurement of a time of using the Web browser is started in Step S02.

In Step S03, it is judged whether or not image data obtained by the Web browser via the IP network 3 is printed out. If it is not printed out (NO in Step S03), the routine proceeds to Step S05. If it is printed out (YES in Step S03), the print flag is turned to "ON" in Step S04, then the routine proceeds to Step S05.

In Step S05, it is judged whether or not use of the Web browser is still continued. If it is still continued (YES in Step S05), the routine goes back to Step S03 and repeats Steps S03 through S05 until it is finished.

If use of the Web browser is finished (NO in Step S05), measurement of a time of using the Web browser is finished in Step S06, and it is judged in Step S07, whether or not the print flag indicates "ON".

If the print flag does not indicate "ON" (NO in Step S07), since it means that image data obtained by the Web browser is not printed out, the routine proceeds to Step S08, in which a usage fee for using the Web browser for the measured time is calculated based on the usage fee per unit time set in advance. This calculated usage fee for using the Web browser is billed to a user who used the Web browser.

Meanwhile, if the print flag indicates "ON" (YES in Step S07), since it means that image data obtained by the Web browser is printed out, the routine proceeds to Step S09, in which a usage fee for using the Web browser is determined as "0".

As described above, in this embodiment, a usage fee for using a Web browser, which is calculated based on a time of using the Web browser, is billed to a user. Meanwhile, if image data obtained by the Web browser is printed out, a usage fee for using the Web browser is not billed but only a print fee is billed. Thus, that could strongly encourage users to print image data obtained by a Web browser, and installation of a Web browser could enhance the effect of promoting print practice.

Figure 4:
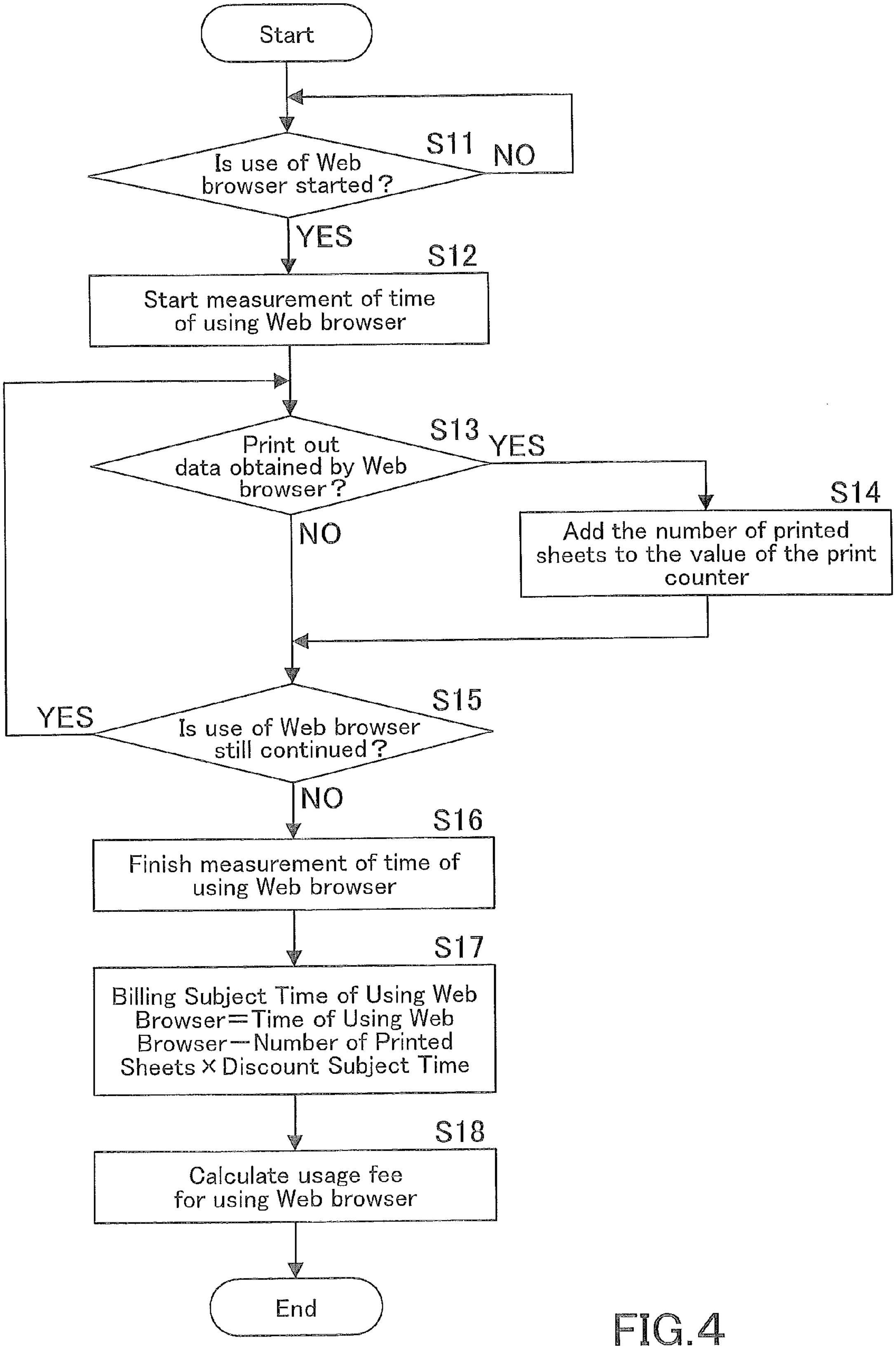
FIG. 4 is a flowchart representing a billing procedure that is executed in the image forming apparatus in another embodiment of the present invention.

FIG. 4 is a flowchart representing a billing procedure that is executed in the image forming apparatus 1 in another embodiment of the present invention.

Figure 3:
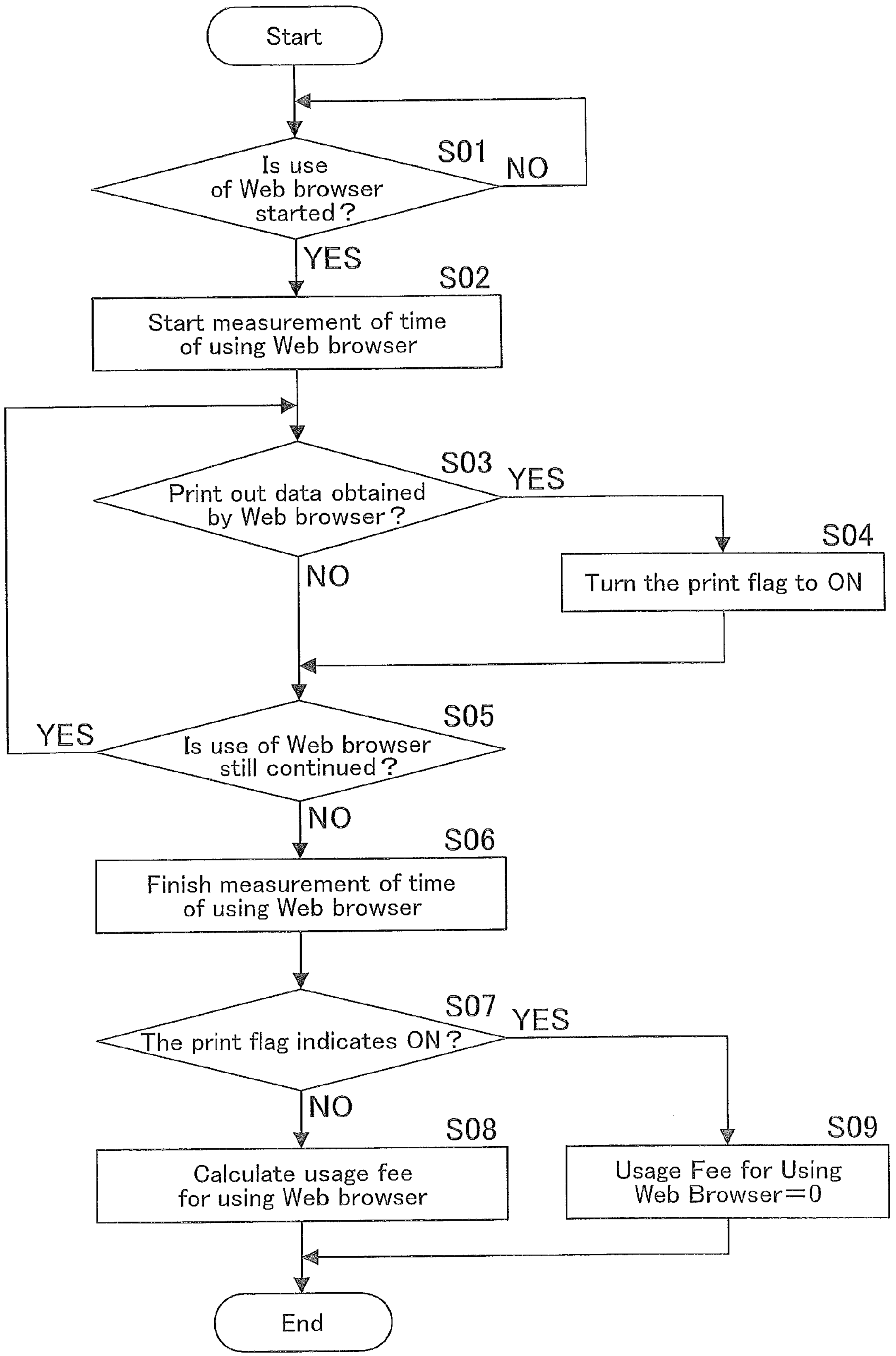
FIG. 3 is a flowchart representing a billing procedure executed in the image forming apparatus shown in FIG. 1.

In the embodiment explained with FIG. 3, if image data obtained by a Web browser is printed out, a usage fee for using the Web browser is not billed. Meanwhile, in the embodiment to be hereinafter explained with FIG. 4, if image data obtained by a Web browser is printed out, a usage fee for using the Web browser is discounted depending on the number of printed sheets.

A usage fee for using a Web browser per unit time should be set in advance on the image forming apparatus 1 (for example, it is set as "¥10/60" for the case of Usage Fee Per Unit Time: 10 yen for every 60 seconds). And also, a discount subject time of using the Web browser to print one sheet, should be set in advance thereon (for example, Discount Subject Time to Print One Sheet: 20 seconds).

In Step S11, the routine waits until use of the Web browser is started. If use of the Web browser is started (YES in Step S11), measurement of a time of using the Web browser is started in Step S12.

In Step S13, it is judged whether or not image data obtained by the Web browser via the IP network 3 is printed out. If it is not printed out (NO in Step S13), the routine proceeds to Step S15. If it is printed out (YES in Step S13), the number of the printed sheets is added to the value of the print counter in Step S14, then the routine proceeds to Step S15.

In Step S15, it is judged whether or not use of the Web browser is still continued. If it is still continued (YES in Step S15), the routine goes back to Step S13 and repeats Steps S13 through S15 until it is finished.

If user of the Web browser is finished (NO in Step S15), measurement of a time of using the Web browser is finished in Step S16, and a billing subject time of using the Web browser, in other words, a total billing subject time is calculated in Step S17. In this example, the discount subject time of using the Web browser to print one sheet, is set in advance. Based on this time, a billing subject time of using the Web browser is calculated according to the following formula.

$$\text{Billing Subject Time of Using Web Browser} = \text{Time of Using Web Browser} - (\text{Number of Printed Sheets} \times \text{Discount Subject Time to Print One Sheet})$$

Subsequently, in Step S18, a usage fee for using the Web browser for the billing subject time is calculated based on the usage fee for using the Web browser per unit time, which is set in advance. As well as a print fee, this calculated usage fee for using the Web browser is billed to the user who used the Web browser.

As described above, in this embodiment, if image data obtained by a Web browser is printed out, a usage fee for using the Web browser is discounted depending on the number of printed sheets. Thus, installation of a Web browser could enhance the effect of promoting print practice.

Figure 5:
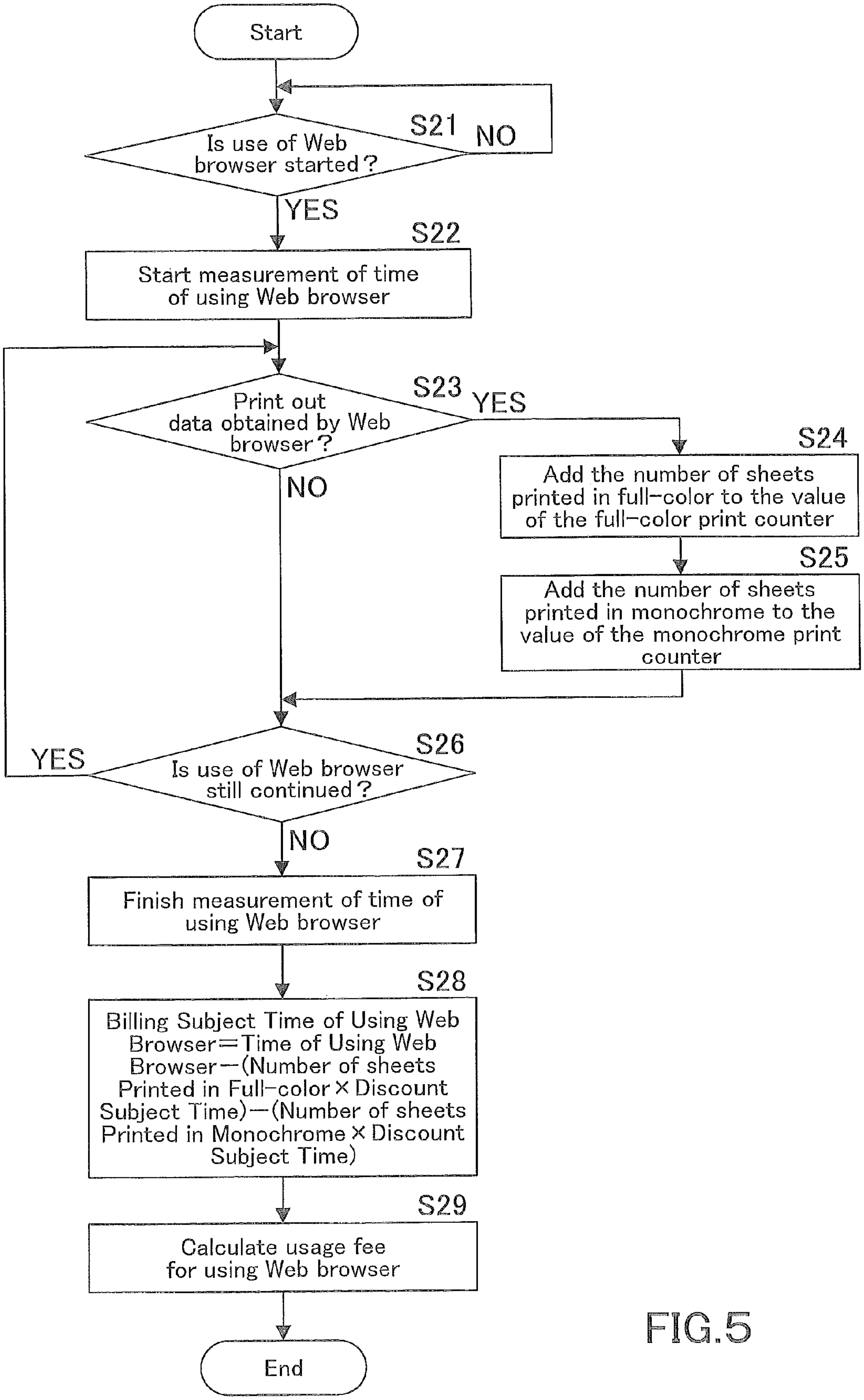
FIG. 5 is a flowchart representing a billing procedure that is executed in the image forming apparatus in yet another embodiment of the present invention.

FIG. 5 is a flowchart representing a billing procedure that is executed in image forming apparatus 1 in yet another embodiment of the present invention.

In the embodiment explained with FIG. 4, if image data obtained by a Web browser is printed out, a usage fee for using the Web browser is discounted depending on the number of printed sheets. Meanwhile, in this embodiment to be hereinafter explained with FIG. 5, different discount rates for printing one sheet are set in advance for full-color printing and monochrome printing, and a fee to be billed is discounted depending on the number of printed sheets and whether full-color printing or monochrome printing.

A usage fee for using a Web browser per unit time should be set in advance on the image forming apparatus 1 (for example, it is set as "¥10/60" for the case of Usage Fee per Unit Time: 10 yen for every 60 seconds). And also, a discount subject time of using the Web browser to print one sheet should be set in advance thereon for full-color printing and monochrome printing, respectively (for example, Discount Subject Time to Print One Sheet in Full-color: 20 seconds, Discount Subject Time to Print One Sheet in Monochrome: 10 seconds)

In Step S21, the routine waits until use of the Web browser is started. If use of the Web browser is started (YES in Step S21), measurement of a time of using the Web browser is started in Step S22.

In Step S23, it is judged whether or not image data obtained by the Web browser via the IP network 3 is printed out. If it is not printed out (NO in Step S23), the routine proceeds to Step S26. If it is printed out (YES in Step S23), the number of the sheets printed in full-color, is added to the value of the full-color print counter in Step S24, and the number of the sheets printed in monochrome, is added to the value of the monochrome print counter in Step S25. After that, the routine proceeds to Step S26.

In Step S26, it is judged whether or not use of the Web browser is still continued. If it is still continued (YES in Step S26), the routine goes back to Step S23 and repeats Steps S23 through S26 until it is finished.

If use of the Web browser is finished (NO in Step S26), measurement of a time of using the Web browser is finished in Step S27, and a billing subject time of using the Web browser is calculated in Step S28. In this example, the discount subject time of using the Web browser to print one sheet is set in advance for full-color printing and monochrome printing, respectively. Based on these times, a billing subject time of using the Web browser is calculated according to the following formula.

Billing Subject Time of Using Web Browser=Time of Using Web Browser−(Number of Sheets Printed in Full-color×Discount Subject Time to Print One Sheet in Full-color)−(Number of Sheets Printed in Monochrome×Discount Subject Time to Print One Sheet in Monochrome)

Subsequently, in Step S29, a usage fee for using the Web browser for the billing subject time is calculated based on the fee for using the Web browser per unit time, which is set in advance.

As described above, in this embodiment, if image data obtained by a Web browser is printed out, a usage fee for using the Web browser is discounted depending on the number of sheets printed in full-color or the number of sheets printed in monochrome. Thus, installation of a Web browser could enhance the effect of promoting print practice.

Figure 6:
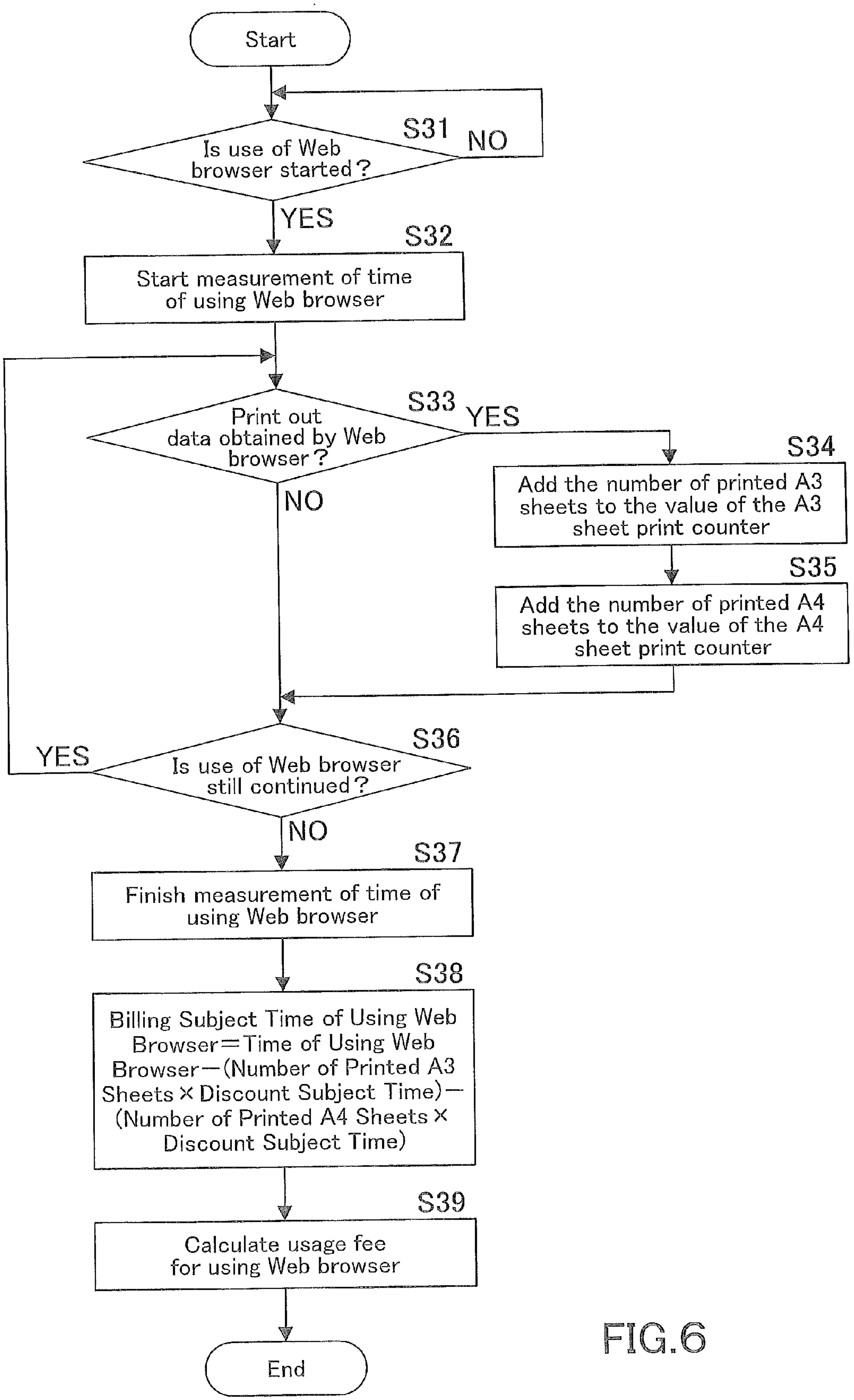
FIG. 6 is a flowchart representing a billing procedure that is executed in the image forming apparatus in still yet another embodiment of the present invention.

FIG. 6 is a flowchart representing a billing procedure that is executed in the image forming apparatus 1 in still yet another embodiment of the present invention.

In the embodiments explained with FIG. 4 and FIG. 5, if image data obtained by a Web browser is printed out, a usage fee for using the Web browser is discounted depending on the number of printed sheets. Meanwhile, in the embodiment to be hereinafter explained with FIG. 6, different discount rates for printing one sheet is set in advance for respective print sheet sizes, and a fee to be billed is discounted depending on the number of printed sheets and a print sheet size.

A usage fee for using a Web browser per unit time should be set in advance on the image forming apparatus 1 (for example, it is set as "¥10/60" for the case of Usage Fee per Unit Time: 10 yen for every 60 seconds). And also, a discount subject time of using the Web browser to print one sheet should be set in advance thereon for each sheet size (for example, Discount Subject Time to Print One A3 Sheet: 20 seconds, Discount Subject Time to Print One A4 Sheet: 10 seconds. Sheets are not limited to these sizes).

In Step S31, the routine waits until use of the Web browser is started. If use of the Web browser is started (YES in Step S31), measurement of a time of using the Web browser is started in Step S32.

In Step S33, it is judged whether or not image data obtained by the Web browser via the IP network 3 is printed out. If it is not printed out (NO in Step S33), the routine proceeds to Step S36. If it is printed out (YES in Step S33), the number of printed A3 sheets is added to the value of the A3 sheet print counter in Step S34, and the number of printed A4 sheets is added to the value of the A4 sheet print counter in Step S35. After that, the routine proceeds to Step S36.

In Step S36, it is judged whether or not use of the Web browser is still continued. If it is still continued (YES in Step S36), the routine goes back to Step S33 and repeats Steps S33 through S36 until it is finished.

If use of the Web browser is finished (NO in Step S36), measurement of a time of using the Web browser is finished in Step S37, and a billing subject time of using the Web browser is calculated in Step S38. In this example, the discount subject time of using the Web browser is set in advance for A3 sheets and A4 sheets, respectively. Based on these times, a billing subject time of using the Web browser is calculated according to the following formula.

Billing Subject Time of Using Web Browser=Time of Using Web Browser−(Number of Printed A3 Sheets×Discount Subject Time to Print One A3 Sheet)−(Number of Printed A4 Sheets×Discount Subject Time to Print One A4 Sheet)

Subsequently, in Step S39, a usage fee for using the Web browser for the billing subject time is calculated based on the usage fee for using the Web browser per unit time, which is set in advance.

As described above, in this embodiment, if image data obtained by a Web browser is printed out, a usage fee for using the Web browser is discounted depending on a print sheet size. Thus, installation of a Web browser could enhance the effect of promoting print practice.

Figure 7:
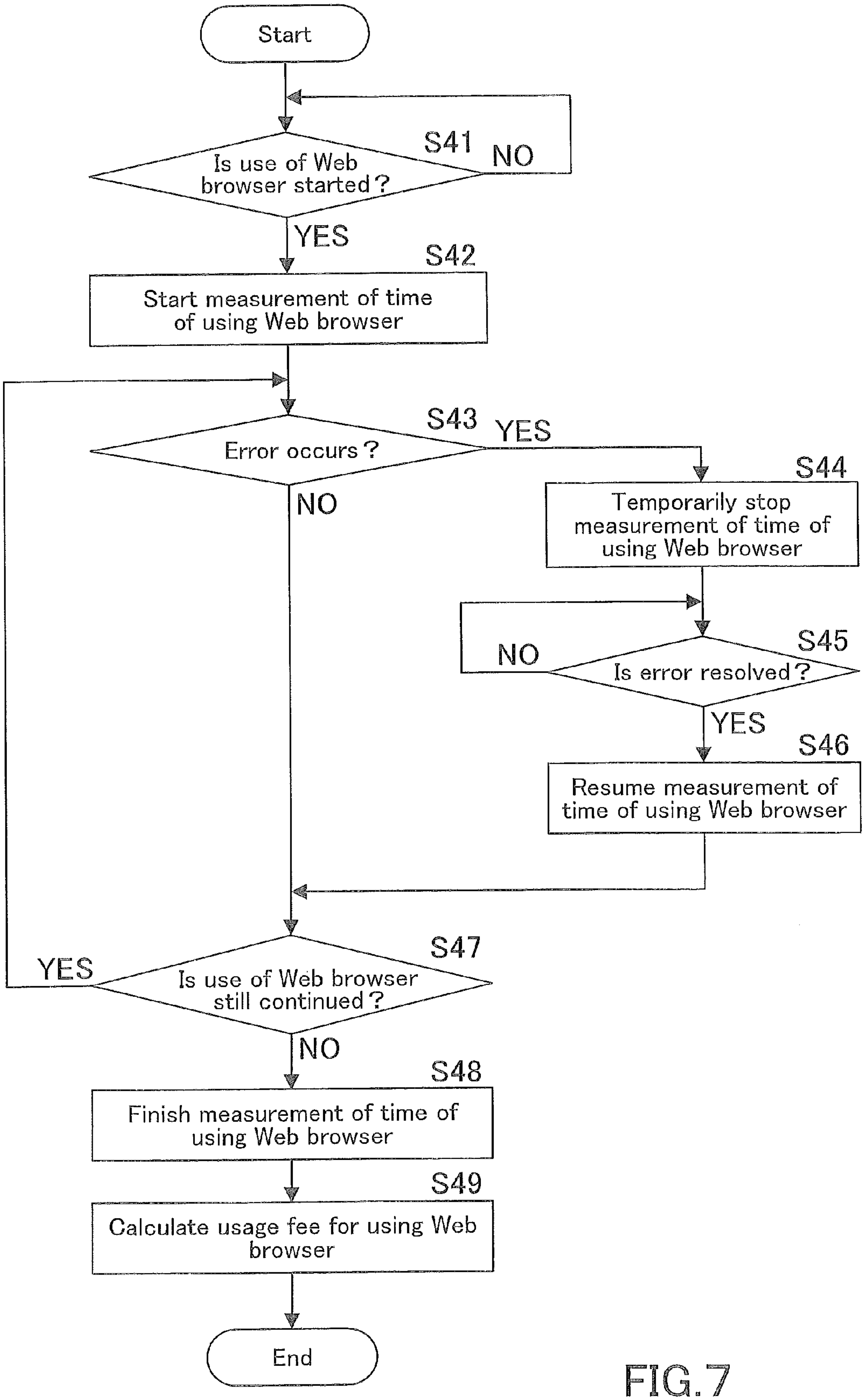
FIG. 7 is a flowchart representing a billing procedure that is executed in the image forming apparatus in still yet another embodiment of the present invention.

FIG. 7 is a flowchart representing a billing procedure that is executed in the image forming apparatus 1 in still yet another embodiment of the present invention.

In this embodiment, if an error disabling use of a Web browser happens to occur during use of the Web browser, a usage fee for using the Web browser for the period of time elapsing from start of occurrence of the error until end thereof, is not billed.

A usage fee for using a Web browser per unit time should be set in advance on the image forming apparatus 1 (for example, it is set as "¥10/60" for the case of Usage Fee per Unit Time: 10 yen for every 60 seconds).

In Step S41, the routine waits until use of the Web browser is started. If use of the Web browser is started (YES in Step S41), measurement of a time of using the Web browser is started in Step S42.

In Step S43, it is judged whether or not an error disabling use of the Web browser occurs during use of the Web browser. For example, such an error may be occurrence of a jam, in which an alert message is displayed and use of the Web browser is disabled until the error is resolved.

If such an error does not occur (NO in Step S43), the routine proceeds to Step S47. If such an error occurs (YES in Step S43), measurement of a time of using the Web browser is temporarily stopped in Step S44, and it is judged in Step S45, whether or not this error is resolved.

If this error is not resolved (NO in Step S45), the routine waits until it is resolved. If this error is resolved and use of the Web browser is enabled again (YES in Step S45), measurement of a time of using the Web browser is resumed in Step S46, then the routine proceeds to Step S47.

In Step S47, it is judged whether or not use of the Web browser is still continued. If it is still continued (YES in Step S47), the routine proceeds to Step S43 and repeats from Steps S43 through S47 until it is finished.

If use of the Web browser is finished (NO in Step S47), measurement of a time of using the Web browser is finished in Step S48. Then in Step S49, a usage fee for using the Web browser for the billing subject time is calculated based on the usage fee for using the Web browser per unit time, which is set in advance.

Ad described above, in this embodiment, if an error disabling use of a Web browser happens to occur during use of the Web browser, a usage fee for using the Web browser for the period of time elapsing from start of occurrence of the error until end thereof, is not billed. Thus, that could eliminate user inconveniences caused due to occurrence of an error.

Figure 8A:
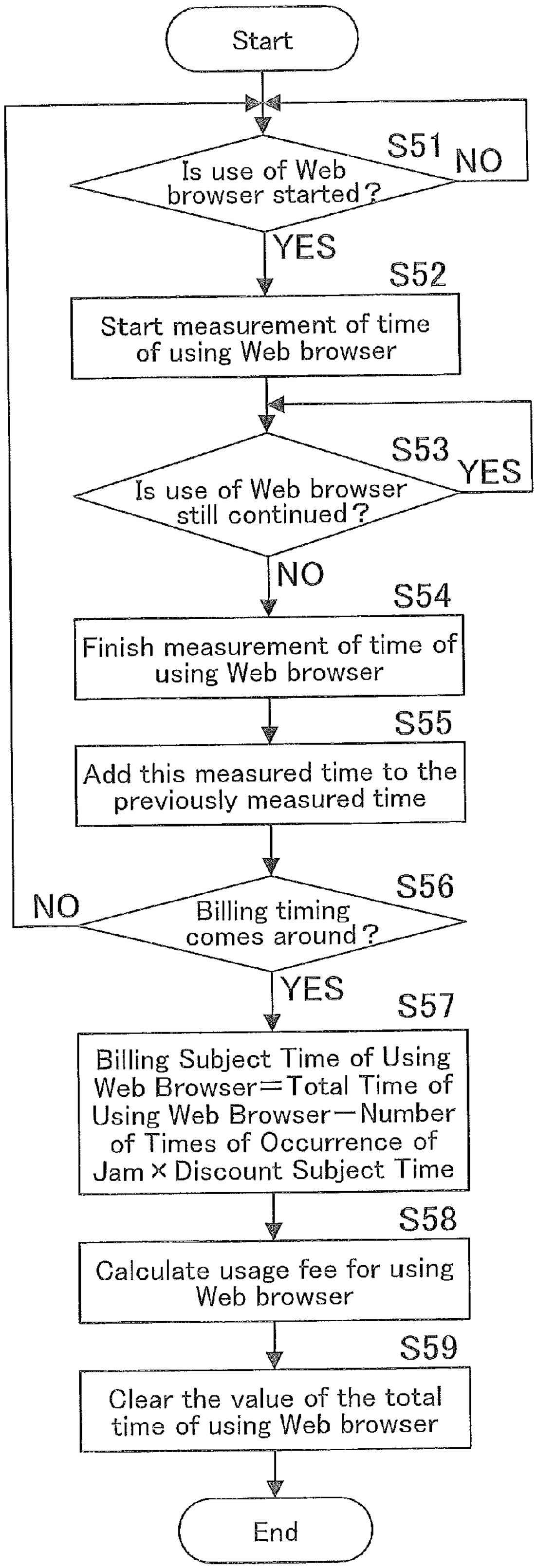
FIG. 8 is a flowchart representing a billing procedure that is executed in the image forming apparatus in still yet another embodiment of the present invention.
Figure 8B:
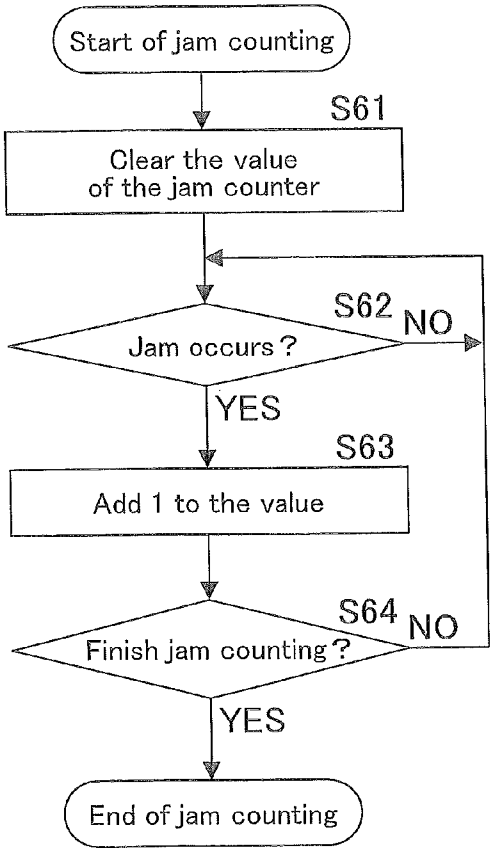

FIG. 8 shows still yet another embodiment of the present invention. FIG. 8(*a*) is a flowchart representing a billing procedure that is executed in the image forming apparatus 1, and FIG. 8(*b*) is a flowchart representing a count procedure to count the number of times of occurrence of a jam.

In this embodiment, a usage fee for using a Web browser is billed at a predetermined interval, and a usage fee to be billed is discounted depending on the number of times that a jam occurs for the predetermined interval.

A usage fee for using a Web browser per unit time should be set in advance on the image forming apparatus 1 (for example, it is set as "¥10/60" for the case of Usage Fee per Unit Time: 10 yen for every 60 seconds).

Furthermore, a jam counter that counts the number of times that a jam occurs during a print operation should be provided in advance in the image forming apparatus 1. And also, a discount subject time per occurrence of a jam should be set in advance thereon (for example, Discount Subject Time per Occurrence of Jam: 10 seconds).

In Step S51 of FIG. 8(*a*), the routine waits until use of the Web browser is started. If it is started (YES in Step S51), measurement of a time of using the Web browser is started in Step S52.

In Step S53, it is judged whether or not use of the Web browser is still continued. If it is still continued (YES in Step S53), the routine waits until it is finished. If use of the Web browser is finished (NO in Step S53), measurement of a time of using the Web browser is finished in Step S54, and this measured time is added to the time of using the Web browser, which is previously measured, in Step S55. Then the routine proceeds to Step S56.

In this embodiment, a fee is billed at a predetermined interval, for example every month. Thus, it is judged in Step S56, whether or not a billing timing comes around. If a billing timing does not come around yet (NO in Step S56), the routine goes back to Step S51 and waits until use of the Web browser is started again.

If a billing timing comes around (YES in Step S56), a billing subject time of using the Web browser is calculated in Step S57.

In this embodiment, a fee to be billed is discounted depending on the number of times that a jam occurs for a predetermined time (for example, one month) that is subject to billing. The number of times of occurrence of a jam is counted by the jam counter as shown in the flowchart of FIG. 8(*b*) to be explained later, and the discount rate per occurrence of a jam is set in advance. Based on the information, a billing subject time of using the Web browser is calculated according to the following formula.

Billing SubjectTime of Using Web Browser=Total Time of Using Web Browser−(Number of Times of Occurrence of Jam×Discount Subject Time per Occurrence of Jam)

Subsequently, in Step S58, a usage fee for using the Web browser for the billing subject time is calculated based on the usage fee for using the Web browser per unit time, which is set in advance. After that, the value of the total time of using the Web browser is cleared in Step S59.

FIG. 8(*b*) is a flowchart representing a count procedure to count the number of times of occurrence of a jam.

In Step S61, the value of the jam counter is cleared. Then, it is judged in Step S62, whether or not a jam occurs. If no jam occurs (NO in Step S62), the routine waits until it occurs. If a jam occurs (YES in Step S62), "1" is added to the value of the jam counter in Step S63, and it is judged in Step S64, whether or not to finish jam counting. Jam counting is finished if a billing timing comes around in Step S56 of FIG. 8(*a*).

If the jam counter does not finish counting (NO in Step S64), the routine goes back to Step S62. If the jam counter finishes counting (YES in Step S64), the routine immediately terminates.

As described above, in this embodiment, a usage fee for using the Web browser is discounted depending on the number of times of occurrence of a jam, which would provide satisfactory services to users.

Figure 9A:
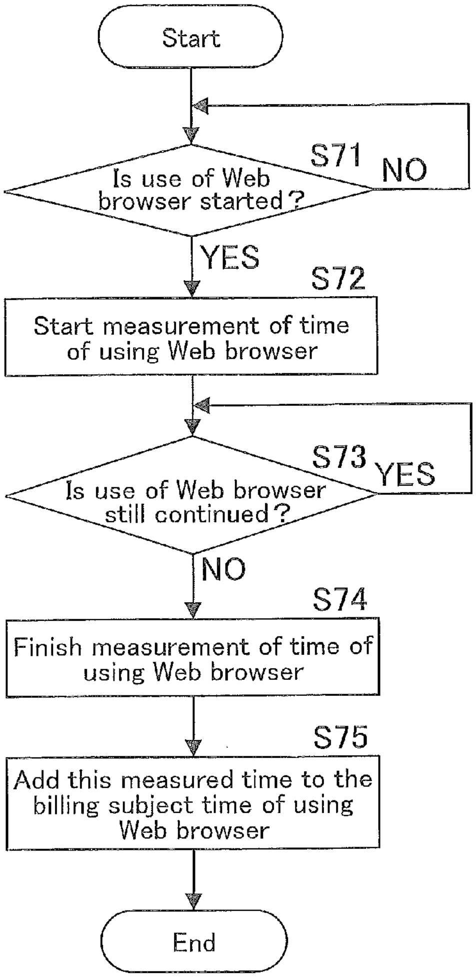
FIG. 9 is a flowchart representing a billing procedure that is executed in the image forming apparatus in still yet another embodiment of the present invention.
Figure 9B:
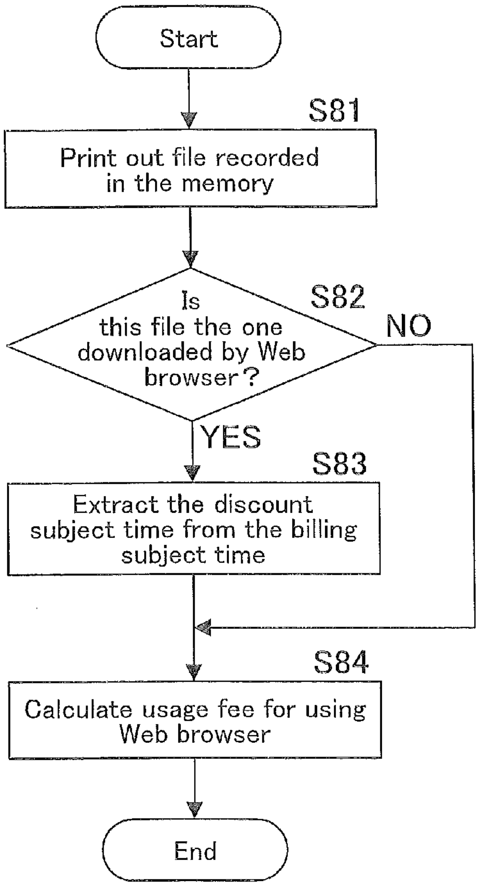

FIG. 9 is a flowchart representing a billing procedure that is executed in the image forming apparatus 1 in still yet another embodiment of the present invention.

In this embodiment, if image data (also referred to as "file") obtained by a Web browser then recorded in the memory 104 is printed out, a usage fee for using the Web browser is discounted.

A usage fee for using a Web browser per unit time should be set in advance on the image forming apparatus 1 (for example, it is set as "¥10/60" for the case of Usage Fee per Unit Time: 10 yen for every 60 seconds).

And also, a discount subject time to print such image data should be set in advance on the image forming apparatus 1 (for example, Discount Subject Time to Print File: 20 seconds).

In Step S71 of FIG. 9(*a*), the routine waits until use of the Web browser is started. If it is started (YES in Step S71), measurement of a time of using the Web browser is started in Step S72.

In Step S73, it is judged whether or not use of the Web browser is still continued. If it is still continued (YES in Step S73), the routine waits until it is finished. If use of the Web browser is finished (NO in Step S73), measurement of a time of using the Web browser is finished in Step S74, and this measured time is added to the billing subject time of using the Web browser, in Step S75.

In Step S81 of FIG. 9(*b*), a file recorded in the memory 104 is printed by the print processor 107, according to user instruction. Then it is judged in Step S82, whether or not the printed file is the one obtained (downloaded) by the Web browser. If it is not the one obtained by the Web browser (NO in Step S82), the routine terminates, which means a usage fee for using the Web browser is billed without discounts. Meanwhile, if the printed file is the one obtained by the Web browser (YES in Step S82), the discount subject time to print the file is extracted from the billing subject time of using the Web browser.

Subsequently, in Step S84, a usage fee for using the Web browser for the billing subject time is calculated based on the usage fee of using the Web browser per unit time, which is set in advance.

As described above, in this embodiment, if image data obtained by a Web browser then recorded in the memory 104 is printed out, a usage fee for using the Web browser is discounted. Thus, even if a user intends to print out image data obtained by a Web browser, after using the Web browser, he/she can receive a discount.

Figure 10:
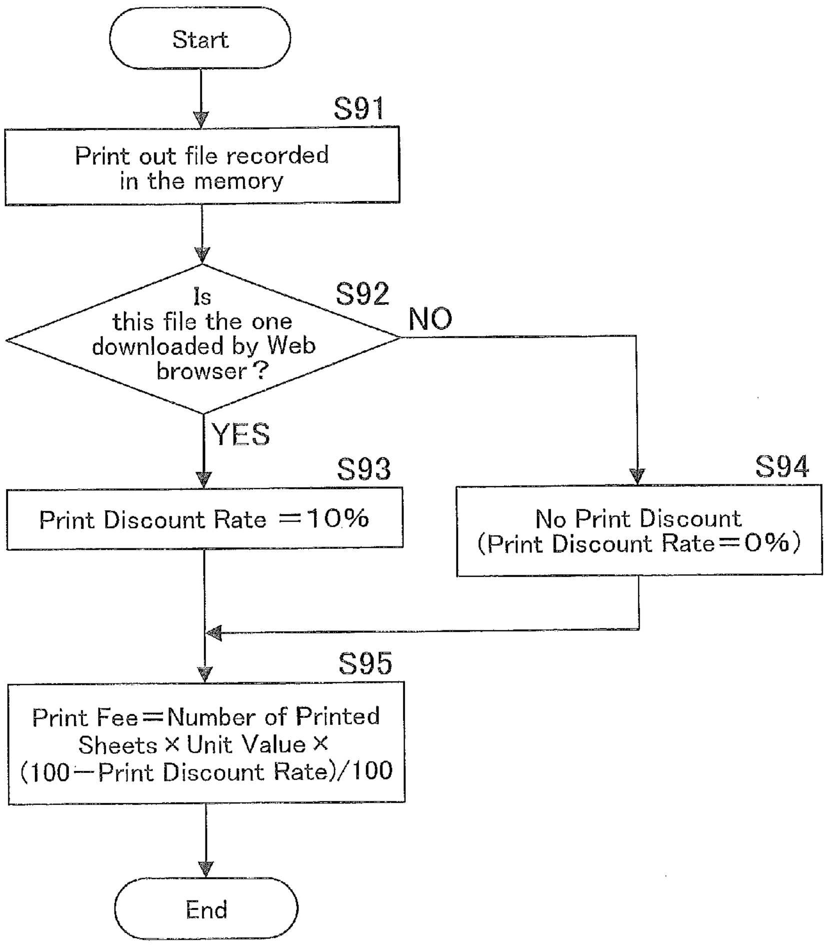
FIG. 10 is a flowchart representing a billing apparatus that is executed in the image forming apparatus in still yet another embodiment of the present invention.

FIG. 10 is a flowchart representing a billing procedure that is executed in the image forming apparatus 1 in still yet another embodiment of the present invention.

In this embodiment, if image data other than the one obtained by a Web browser among the image data (files) recorded in the memory 104 is printed out, a print fee is simply billed. Meanwhile, if image data obtained by the Web browser then recorded in the memory 104 is printed out, a print fee to be billed is discounted.

A unit value for printing one sheet should be set in advance on the image forming apparatus 1. And also, a discount rate (for example, 10%) for printing image data obtained by a Web browser should be set in advance thereon.

In Step S91, image data recorded in the memory 104 is printed out, according to user instruction. Then it is judged in Step S92, whether or not the printed image data is the one downloaded by the Web browser. For example, when image data downloaded by the Web browser from the Web server 2 is recorded in the memory 104, the obtained-by-Web browser flag is turned to "ON" and included in storage information of the image data. Thus, the above-mentioned judgment can be made easily only by checking this flag, when the image data is printed out.

If the printed image data is the one downloaded by the Web browser (YES in Step S92), the 10% print discount rate is applied for the case in Step S93, then the routine proceeds to Step S95. If the printed image data is not the one downloaded by the Web browser (NO in Step S92), the print discount rate is not applied for the case in Step S94, then the routine proceeds to Step S95.

In Step S95, a print fee is calculated according to the following formula.

$$\text{Print Fee} = \text{Number of Printed Sheets} \times \text{Unit Value} \times (100 - \text{Print Discount Rate})/100$$

As described above, in this embodiment, if image data other than the one obtained by a Web browser among the image data recorded in the memory 104 is printed out, a print fee is simply billed. Meanwhile, if image data obtained by the Web browser then recorded in the memory 104 is printed out, a print fee to be billed is discounted. Thus, that could encourage users to use a Web browser, and installation of a Web browser could enhance the effect of promoting print practice.

Each of the above-described examples is one embodiment of the present invention. However, the present invention is not limited thereto. For example, in the embodiments, a usage fee for using a Web browser is calculated based on a time of using the Web browser. Alternatively, it can be calculated based on volume of data obtained by the Web browser via the IP network 3, or based on both a time of using the Web browser and volume of data obtained by the Web browser.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image forming apparatus comprising:

an image data obtainer that obtains image data by a Web browser from a Website via a network;

a printer that prints out the obtained image data and other image data; and a billing portion that bills a usage fee for usage of the Web browser when the Web browser is used, and the billing portion discounts or does not bill the usage fee to be billed when and in response to the fact that both the Web browser is used and also the image data obtained by the Web browser is printed out by the printer.

2. The image forming apparatus recited in claim 1, wherein:

the billing portion bills a usage fee that is calculated based on a time of using the Web browser and/or data volume, if when the Web browser is used but no image data is printed out by the printer, and the billing portion does not bill the usage fee when the image data obtained by the Web browser is printed out by the printer.

3. The image forming apparatus recited in claim 1, wherein:

the billing portion bills a usage fee that is calculated based on a time of using the Web browser and/or data volume, when the Web browser is used but no image data is printed out by the printer, and the billing portion discounts a fee to be billed, depending on the number of printed sheets, when the image data obtained by the Web browser is printed out by the printer.

4. The image forming apparatus recited in claim 3, wherein:

different discount rates are set in advance for full-color printing and monochrome printing, and the billing portion discounts a fee to be billed, depending on the number of printed sheets and whether full-color printing or monochrome printing.

5. The image forming apparatus recited in claim 1, wherein:

different discount rates are set in advance for respective print sheet sizes, and the billing portion discounts a fee to be billed, based on the number of printed sheets and a print sheet size.

6. The image forming apparatus recited in claim 1, wherein:

the billing portion bills a usage fee that is calculated based on a time of using the Web browser, when the Web browser is used but no image data is printed out by the printer, and the billing portion excludes from the usage fee to be billed, a usage fee for using the Web browser for a period of time elapsing from occurrence of the error until resolution thereof, when an error disabling use of the Web browser happens to occur during use of the Web browser.

7. The image forming apparatus recited in claim 1, wherein:

the billing portion bills the usage fee at a predetermined interval, further comprising:

a counter that counts the number of times that a jam occurs during the predetermined interval, and wherein:

the billing portion discounts a usage fee to be billed, depending on the number of times of occurrence of a jam, which is counted by the counter.

8. The image forming apparatus recited in claim 1, further comprising:

a memory that records in itself the image data obtained by the Web browser, and wherein:

the billing portion discounts a usage fee to be billed, when the image data obtained by the Web browser then recorded in the memory is printed out by the printer.

9. An image forming apparatus comprising:

an image data obtainer that obtains image data by a Web browser from a Website via a network;

a printer that prints out the obtained image data and other image data;

a memory that records in itself, the image data obtained by the Web browser; and a billing portion that bills a print fee when image data other than the one obtained by the Web browser among the image data recorded in the memory is printed out by the printer, and when the image data obtained by the Web browser then recorded in the memory is printed out by the printer, the billing portion discounts the print fee to be billed in response to the fact that the image data being printed is obtained by the Web browser and recorded in the memory.

10. A billing method of an image forming apparatus, comprising:

obtaining image data by a Web browser from a Website via a network;

printing out the obtained image data and other image data by a printer; and billing a usage fee when the Web browser is used, and discounting or not billing the usage fee to be billed when and in response to the fact that both the Web browser is used and also the image data obtained by the Web browser is printed out by the printer.

11. The billing method of an image forming apparatus, recited in claim 10, wherein:

a usage fee that is calculated based on a time of using the Web browser and/or data volume, is billed when the Web browser is used but no image data is printed out by the printer, and a fee to be billed is discounted depending on the number of printed sheets, when the image data obtained by the Web browser is printed out by the printer.

12. The billing method of an image forming apparatus, recited in claim 10, wherein:

a usage fee that is calculated based on a time of using the Web browser and/or data volume, is billed when the Web browser is used but no image data is printed out by the printer, and a fee to be billed is discounted depending on the number of printed sheets, when the image data obtained by the Web browser is printed out by the printer.

13. The billing method of an image forming apparatus, recited in claim 12, wherein:

different discount rates are set in advance for full-color printing and monochrome printing, and a fee to be billed is discounted depending on the number of printed sheets and whether full-color printing or monochrome printing.

14. The billing method of an image forming apparatus, recited in claim 12, wherein:

different discount rates are set in advance for respective print sheet sizes, and a fee to be billed is discounted based on the number of printed sheets and a print sheet size.

15. The billing method of an image forming apparatus, recited in claim 10, wherein:

a usage fee that is calculated based on a time of using the Web browser, is billed when the Web browser is used but no image data is printed out by the printer, and a usage fee for using the Web browser for a period of time elapsing from occurrence of the error until resolution thereof, is excluded from the usage fee to be billed, when an error disabling use of the Web browser happens to occur during use of the Web browser.

16. The billing method of an image forming apparatus, recited in claim 10, wherein:

the usage fee is billed at a predetermined interval, further comprising:

counting the number of times that a jam occurs during the predetermined interval, and wherein:

a usage fee to be billed is discounted depending on the counted number of times of occurrence of a jam.

17. The billing method of an image forming apparatus, recited in claim 10, further comprising:

recording in a memory, the image data obtained by the Web browser, and wherein:

a usage fee to be billed is discounted when the image data obtained by the Web browser then recorded in the memory is printed out by the printer.

18. A billing method of an image forming apparatus, comprising:

obtaining image data by a Web browser from a Website via a network;

printing out the obtained image data and other image data by a printer;

recording in a memory the image data obtained by the Web browser; and billing a print fee when image data other than the one obtained by the Web browser among the image data recorded in the memory is printed out by the printer, and when the image data obtained by the Web browser then recorded in the memory is printed out by the printer, discounting the print fee to be billed in response to the fact that the image data being printed is obtained by the Web browser and recorded in the memory.

19. A non-transitory computer readable recording medium having a billing program recorded therein to make a computer of an image forming apparatus execute:

obtaining image data by a Web browser from a Website via a network;

printing out the obtained image data and other image data by a printer; and billing a usage fee for usage of the Web browser when the Web browser is used, and discounting or not billing the usage fee to be billed when and in response to the fact that both the Web browser is used and also the image data obtained by the Web browser is printed out by the printer.

20. A non-transitory computer readable recording medium having a billing program recorded therein to make a computer of an image forming apparatus execute:

obtaining image data by a Web browser from a Website via a network;

printing out the obtained image data and other image data by a printer;

recording in a memory the image data obtained by the Web browser; and billing a print fee when image data other than the one obtained by the Web browser among the image data recorded in the memory is printed out by the printer, and when the image data obtained by the Web browser then recorded in the memory is printed out by the printer, discounting the print fee to be billed in response to the fact that the image data being printed is obtained by the Web browser and recorded in the memory.

* * * * *